United States Patent [19]
Larson et al.

[11] Patent Number: 5,481,680
[45] Date of Patent: Jan. 2, 1996

[54] DYNAMICALLY PROGRAMMABLE BUS ARBITER WITH PROVISIONS FOR HISTORICAL FEEDBACK AND ERROR DETECTION AND CORRECTION

[75] Inventors: Mikiel L. Larson, St Charles; Wayne R. Wilcox, Naperville, both of Ill.

[73] Assignee: AT&T Corp., Murray Hill, N.J.

[21] Appl. No.: 425,317

[22] Filed: Apr. 14, 1995

Related U.S. Application Data

[63] Continuation of Ser. No. 63,380, May 17, 1993, abandoned.

[51] Int. Cl.[6] ............................. G06F 13/18; G06F 3/04
[52] U.S. Cl. ........................ 395/292; 395/293; 395/296
[58] Field of Search ................................ 395/325

[56] References Cited

U.S. PATENT DOCUMENTS

| | | | |
|---|---|---|---|
| 4,009,470 | 2/1977 | Danilenko et al. | 395/425 |
| 4,237,534 | 12/1980 | Felix | 395/325 |
| 4,536,839 | 8/1985 | Shah et al. | 395/425 |
| 4,609,995 | 9/1986 | Hasebe | 364/900 |
| 4,814,974 | 3/1989 | Narayanan et al. | 395/725 |
| 4,941,086 | 7/1990 | Kriz | 395/325 |
| 4,974,148 | 11/1990 | Matteson | 395/325 |
| 4,979,100 | 12/1990 | Makris et al. | 364/200 |
| 5,151,994 | 9/1992 | Wille et al. | 395/800 |
| 5,160,923 | 11/1992 | Sugawara et al. | 340/825.51 |
| 5,195,185 | 3/1993 | Marenin | 395/325 |
| 5,287,463 | 2/1994 | Frame et al. | 395/325 |
| 5,291,584 | 3/1994 | Challa et al. | 395/500 |
| 5,301,283 | 4/1994 | Thacker et al. | 395/325 |

OTHER PUBLICATIONS

IBM Technical Disclosure Bulletin, Nov., 1993, US, vol. 36, 11, pp. 317–320, "Arbitration History Buffer".

*Primary Examiner*—Jack B. Harvey
*Assistant Examiner*—Jeffrey K. Seto
*Attorney, Agent, or Firm*—Michael B. Johannesenn

[57] ABSTRACT

An arbitration circuit that uses a unique history register that is combined with a value representing bus requests to index into a table. All possible combinations of history register requests are stored in the table along with a corresponding grant. A block of the table is selected by the history register, and then the request is used to index into the block to determine which request receives a grant. The grant is then shifted into the history register. Advantageously, more than one table may be stored in memory which can be selected by an arbiter controller.

21 Claims, 5 Drawing Sheets

FIG. 5

| H3 | H2 | H1 | H0 | REQUEST |
|----|----|----|----|---------|
| 3  0 | 3  0 | 3  0 | 3  0 | 3  0 BITS |

| H3 | H2 | H1 | H0 | REQUEST |
|------|------|------|------|---------|
| 0000 | 0000 | 0000 | 0000 | XXXX |

FIG. 7

| ADDRESS | G3 | G2 | G1 | G0 | CYCLES | ERROR CODE |
|---------|----|----|----|----|--------|------------|
| 0000 | 0 | 0 | 0 | 0 | 0 | 0 |
| 0001 | 0 | 0 | 0 | 1 | 5 | 1 |
| 0010 | 0 | 0 | 1 | 0 | 4 | 0 |
| 0011 | 0 | 0 | 0 | 1 | 5 | 1 |
| 0100 | 0 | 1 | 0 | 0 | 2 | 0 |
| 0101 | 0 | 0 | 0 | 1 | 5 | 1 |
| 0110 | 0 | 0 | 1 | 0 | 4 | 0 |
| 0111 | 0 | 0 | 0 | 1 | 5 | 1 |
| 1000 | 1 | 0 | 0 | 0 | 1 | 0 |
| 1001 | 0 | 0 | 0 | 1 | 5 | 1 |
| 1010 | 0 | 0 | 1 | 0 | 4 | 0 |
| 1011 | 0 | 0 | 0 | 1 | 5 | 1 |
| 1100 | 0 | 1 | 0 | 0 | 2 | 0 |
| 1101 | 0 | 0 | 0 | 1 | 5 | 1 |
| 1110 | 0 | 0 | 1 | 0 | 4 | 0 |
| 1111 | 0 | 0 | 0 | 1 | 5 | 1 |

FIG. 8

| H3 | H2 | H1 | H0 | REQUEST |
|---|---|---|---|---|
| 0000 | 0000 | 0000 | 0001 | XXXX |

FIG. 9

| H3 | H2 | H1 | H0 | REQUEST |
|---|---|---|---|---|
| 0000 | 0000 | 0001 | 1000 | XXXX |

FIG. 10

| H3 | H2 | H1 | H0 | REQUEST |
|---|---|---|---|---|
| 0000 | 0001 | 1000 | 0010 | XXXX |

FIG. 11

| H3 | H2 | H1 | H0 | REQUEST |
|---|---|---|---|---|
| 0001 | 1000 | 0010 | 0100 | XXXX |

FIG. 12

| H3 | H2 | H1 | H0 | REQUEST |
|---|---|---|---|---|
| 1000 | 0010 | 0100 | 0001 | XXXX |

DYNAMICALLY PROGRAMMABLE BUS ARBITER WITH PROVISIONS FOR HISTORICAL FEEDBACK AND ERROR DETECTION AND CORRECTION

This application is a continuation of application Ser. No. 08/063,380, filed on May 17, 1993, now abandoned.

TECHNICAL FIELD

This invention relates to the field of computer bus arbitration and, more specifically, to the field of providing bus arbitration which takes previous bus usage into account and provides for selectable bus arbitration algorithms.

BACKGROUND OF THE INVENTION

As more devices are attached to the main memory bus in a computer system, there is more contention for use of the bus. In response to such contention, many different arbitration circuits have been proposed in order to give either fair access or priority access to the bus and thus, to memory resources.

For example, U.S. Pat. No. 5,195,185, which issued in the name of G. B. Marenin on Mar. 16, 1993, discloses an arbitration device which determines bus access based on a priority scheme, and also has a system to dynamically change the priority of any device. This system does not, however, provide flexibility in the basic arbitration scheme; it only responds to a device's increase of its own priority. It also cannot take into account which device previously used the bus in order to give either parity or priority to the other users. Finally, this system is locked into the priority scheme; it cannot be changed from a priority to a parity scheme when appropriate.

A further bus priority scheme is described in U.S. Pat. No. 4,979,100, which issued in the name of Makris, et al., on Dec. 18, 1990. Makris discloses an arbiter circuit which provides two different levels of priority of access to the bus for each processing unit and keeps track of the relative percentages of time of access for the different priority levels. This system provides for interruption of lower priority bus usage by higher priority process units. This system requires complicated overhead to track such bus usage, and is not responsive to previous bus usage by any one system.

Neither of these systems provides for flexible, dynamically changeable arbitration systems which can start in a known state and change from one arbitration scheme to another as conditions change, nor do they react to the past allocation. Therefore, a problem in the art is that there is no bus usage arbiter that provides a dynamic priority scheme with provisions for historical feedback in its grant selection.

SUMMARY OF THE INVENTION

This problem is solved and a technical advance is achieved in the art by an arbitration circuit which takes into account previous bus access as part of the decision to service a requester. In particular, it provides a unique history register that generates a value representing past bus requests which is combined with a value representing current bus requests to access a location in memory. A potential grant is defined and stored in each location in memory for each possible combination of historical requests and current requests. Selection of a potential grant is achieved by using the history register as the high order bits of memory address, and then using the current request as the low order bits of the memory address in order to determine the one grant output to be awarded. The grant is also shifted into the history register. Advantageously, more than one table may be stored in memory to selectably provide a plurality of algorithms.

BRIEF DESCRIPTION OF THE DRAWING

FIG. 5 is an illustration of the history register;

FIG. 6 is an illustration of the history register of an exemplary embodiment of this invention at initialization;

FIG. 7 is an example of a block of memory illustrating a distribution of grants based on requests; and FIGS. 8–12 are illustrations of the shifting of data through the history register according to an exemplary embodiment of this invention.

DETAILED DESCRIPTION

Figure 1:
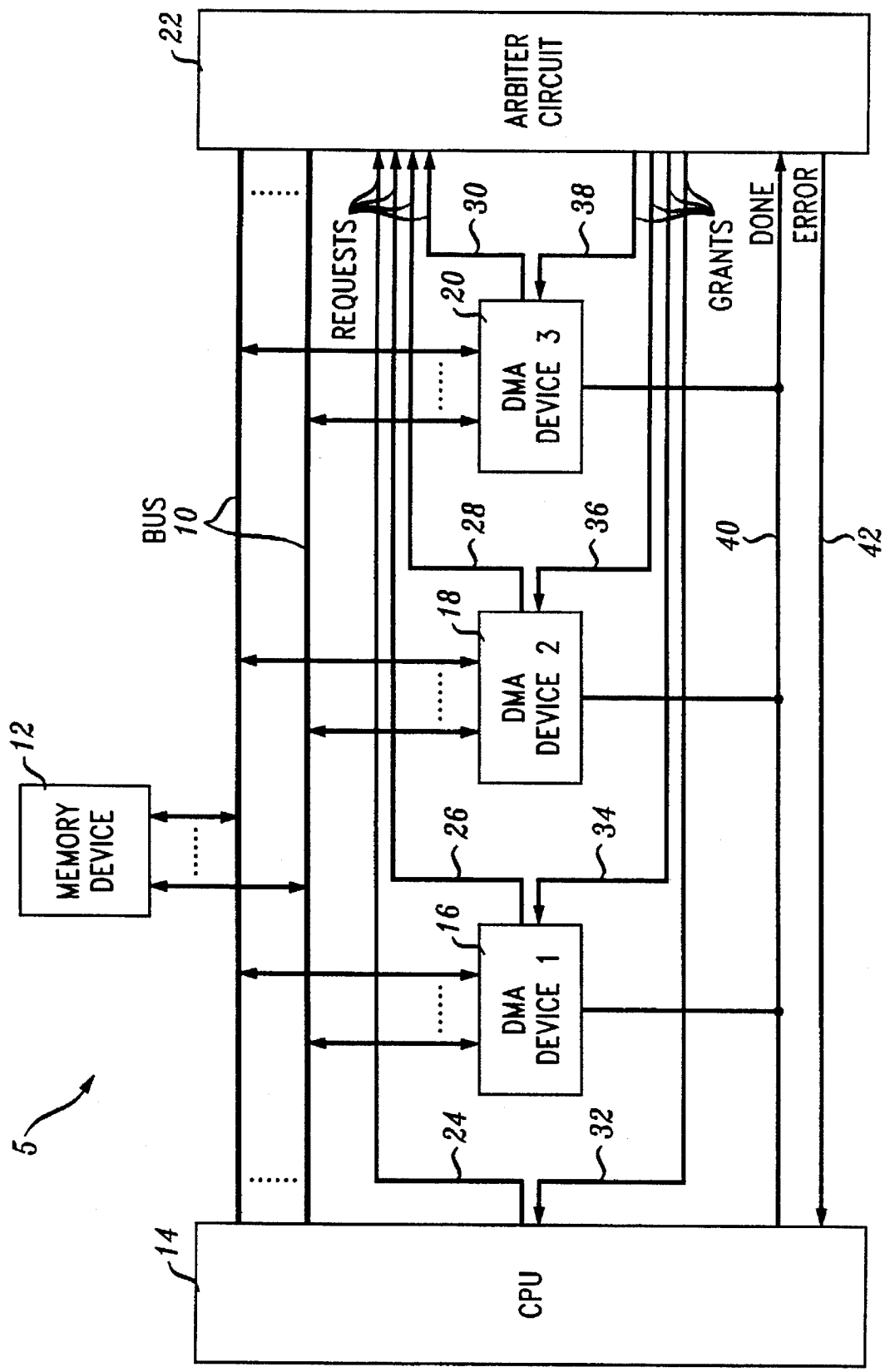
FIG. 1 is a block diagram of a computer system, including an arbiter circuit according to an exemplary embodiment of this invention.

FIG. 1 is a block diagram illustrating an exemplary embodiment of this invention in the context of a computer system 5 including a bus 10 and a memory device 12. For purposes of describing the preferred embodiment of this invention, there are four devices that share bus 10 and memory 12. Central Processing Unit (CPU) 14 is a general purpose CPU, which manipulates and performs other functions as is known in the art on data stored in memory 12. In this exemplary embodiment, there are three Direct Memory Access (DMA) devices 16, 18, and 20 also connected to bus 10. DMA devices 16, 18, and 20 directly read and write locations in memory 12 via bus 10. In order to prevent more than one device from accessing bus 10 at the same time, arbiter circuit 22, according to an exemplary embodiment of this invention, controls access to bus 10 and thus memory 12. Arbiter circuit 22 is not limited to memory access, and may generally control bus access, or access to any device.

When one of devices 14, 16, 18, or 20 wants to access bus 10 (and/or memory 12), it raises a request on request lead 24, 26, 28, or 30, respectively. Arbiter circuit 22 determines which of the devices' requests will be granted, as will be described later, and in response generates a grant signal on one of grant leads 32, 34, 36, or 38. In this preferred embodiment, only one grant at a time will be issued. However, it is within the scope of one skilled in the art that a system could conceivably issue multiple grants. When the device is finished with its bus access, a "done" signal is issued on lead 40. If an error is detected during bus arbitration, arbiter circuit 22 informs CPU 14 on error lead 42, as will be described further, below.

Figure 2:
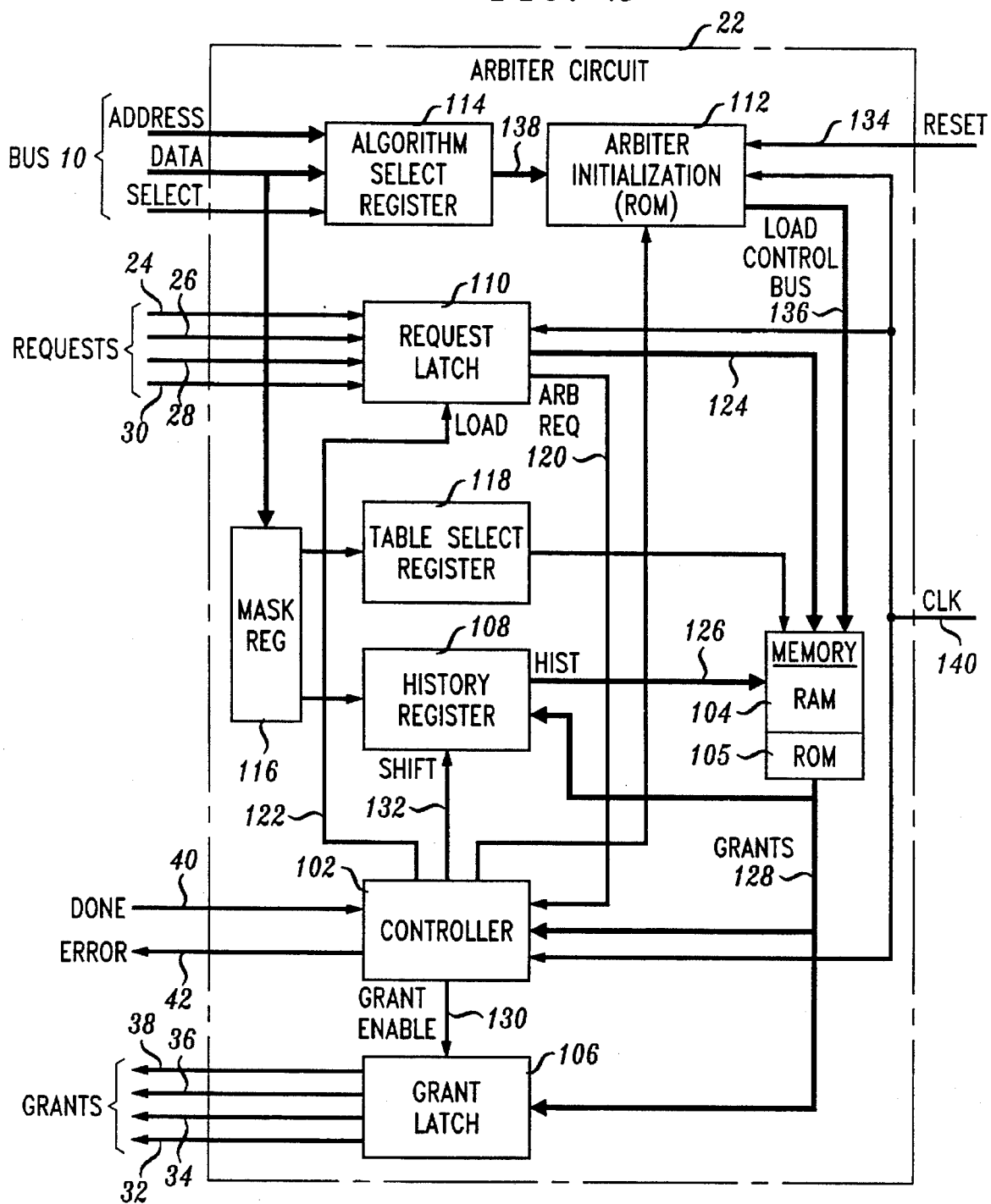
FIG. 2 is a block diagram of the arbiter circuit as shown in FIG. 1.

Turning now to FIG. 2, an arbiter circuit 22 according to an exemplary embodiment of this invention is shown. The arbiter 22 of this exemplary embodiment includes an arbiter controller 102, arbiter memory 104, which is primarily RAM, but also included a block of ROM 105, a grant latch 106, a history register 108, request latch 110, an initialization device (including ROM in the preferred embodiment of this invention) 112, an algorithm select register 114, a mask register 116, and a table select register 118. Requests for control of bus 10 arrive at request latch 110 from devices 14, 16, 18, and 20 (FIG. 1) on request leads 24, 26, 28, and 30.

In this exemplary embodiment, the arrival of such requests triggers request latch to OR all request leads and sends a signal on ARBREQ lead 120 indicating to controller 102 that there is a bus request pending. Controller 102, in response, sends a signal via load line 122 to latch the requests in request latch 110. At this point, the requests are sent via bus 124 to memory 104. The data from history register 108 is then available on history bus 126. The generation of data in the history register will be described later.

The value formed by the bits of the request on bus 124 and a value formed by the bits of the history register on history bus 126 are combined and used as an address into memory 104 which outputs the next grant. Each possible combination of history register and request latch values is stored in memory 104 along with the associated grant that follows the selected arbitration algorithm. Therefore, an algorithm may be implemented simply by determining which combinations of previous grants and current requests requires the next grant. In this manner, any algorithm may be used for selecting grants. An example is described below with reference to FIGS. 5–12. Advantageously, the value from history register 108 is used to select a section or block of memory 104, which comprises the high order bits of the memory address; and the value form by the requests latched in request latch 110 comprises the low order bits of the memory address, which is conceptually used to access the block by indexing into it. Memory 104 returns the grant selected by the address on grant bus 128.

A portion of memory 104 comprises ROM 105. ROM 105 contains at least one algorithm comprising all possible states of history register 108 and request latch 110. Alternatively, ROM 105 may be small and comprise a grant algorithm addressable by the four bits from request latch 110. ROM 105 can be used whenever an error is detected by controller 102, in order to go to a known state, and, optionally, at initialization.

Memory 104 causes the selected grant output to be placed on grant bus 128 and delivered to controller 102, history register 108, and grant latch 106. The outputs consist of 1 of N bits (in this exemplary embodiment, N=4) asserted which defines the selected grant. When controller 102 receives the arbitration request on ARBREQ line 120, it provides a grant latch enable signal on line 130 to allow the grant to be passed to grant lines 32, 34, 36, and 38. Controller 102 also asserts shift line 132 to cause the history register to shift the contents of grant bus 128, in parallel, into history register 108, and shifts the oldest previous grant out, as will be described further below. When the device that received the grant has completed its memory access, it asserts "done" line 40 which is received by controller 102, and starts a new cycle.

Mask register 116 is writable from the data portion of bus 10. The value in mask register 116 is used to mask the shifting of a particular bit through history register 108. This has the effect of erasing the history of a previously asserted grant. Mask register 116 may be written by any device in order to alter the installed algorithm. Advantageously, memory 104 contains more than one arbitration algorithm. Mask register 116 is also connected to a table select register 118. Table select register 118 may be updated by data on the data portion of bus 10 through mask 116, in order to select a portion of memory 104 containing the algorithm desired. One table may be configured as a priority scheme and another may be configured as a parity scheme, thus providing flexibility in which type of scheme can be used at any given time.

The preferred embodiment of this invention also includes a unique error detection mechanism. Optionally, each grant in memory 104 may have associated with it a cyclical redundancy check (CRC) value, a parity value, or other mathematical error checking value, as illustrated in FIG. 7. This value is sent to controller 102 along with the grant via grant bus 128. Controller 102 may then perform the check necessary and compare it to the value found in memory 104. If an error is found, an error signal may be raised on error line 42, which is sent to CPU 14 (FIG. 1) for further action.

Arbiter circuit 22 is initialized when an initialization request comes in on reset line 134 and is received at arbiter initialization 112. Arbiter initialization 112 sends reset signals to controller 102, memory 104, history register 108, grant latch 106, mask register 116, and request latch 110 over reset signal lines (not shown for clarity). As part of initialization, controller 102 causes a specified allocation algorithm stored in arbiter initialization ROM 112 to be loaded into memory 104 via line load control bus 136. The content of the data to be loaded is controlled by the algorithm select register 114. The select register 114 is loaded by CPU 14 (FIG. 1) over the address and data lines of bus 10. Bus 138 provides an index into the arbiter initialization (ROM) 112, to control which arbitration algorithm is downloaded to operational memory 104.

Figure 3:
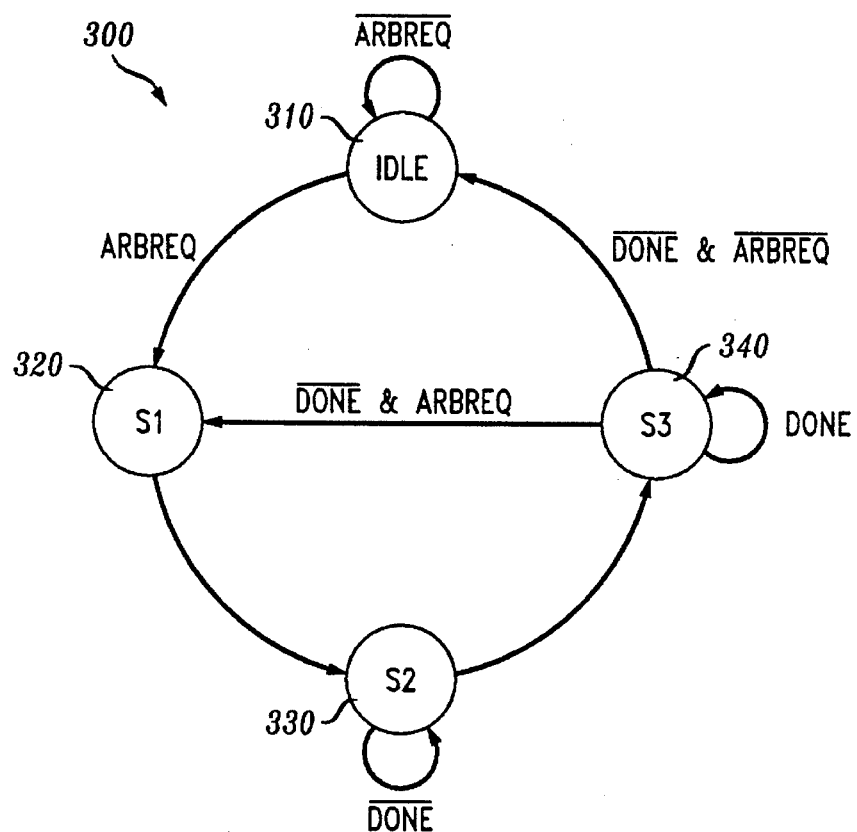
FIG. 3 is a state diagram of the arbiter circuit of FIG. 2.

Turning now to FIG. 3, a state machine as found in controller 102 of FIG. 2 is shown, describing the various states and the resultant level of the leads to and from controller 102. Idle state 310 is entered upon initialization. Controller 102 remains in idle state 310 as long as there are no requests present at request latch 140 (FIG. 2). When one or more requests are received, state machine 300 transitions during the next clock cycle from idle state 310 to state S1 320. In state S1, the controller causes the load signal to go low, as will be described below in connection with FIG. 4, and causes the grant enable line 130 to be asserted.

State machine 300 then transitions during the next clock cycle from state S1 320 to state S2 330. State machine 300 remains in state S2 330 until the "done" signal is asserted. When the "done" signal is asserted, state machine 300 transitions from state S2 330 to state S3 340, wherein the load signal is asserted and the grant enable signal is released after "done" signal has been released. State machine 300 stays in state S3 340 as long as the "done" signal is asserted. If the "done" signal is released and the ARBREQ lead is asserted, the state machine transitions back to state S1 320 because another arbitration request has been received, or conversely because there were a plurality of arbitration requests when the request lead was first asserted. The state machine also transitions from state S3 340 back to idle state 310 when both the "done" and the request leads are no longer asserted.

Figure 4:
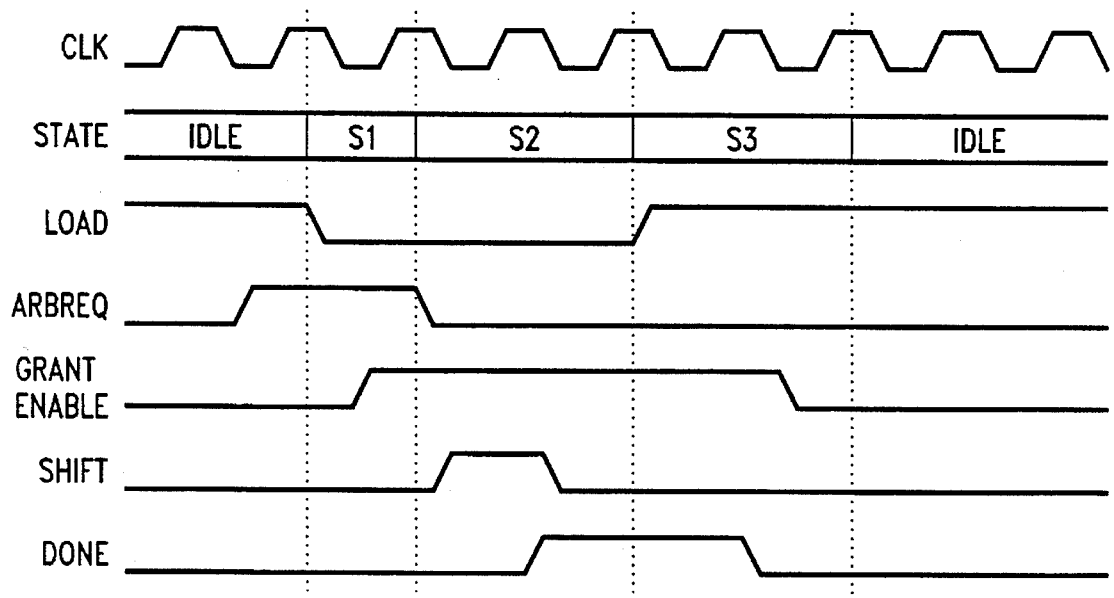
FIG. 4 is a timing diagram of the arbiter circuit of FIG. 2.

Turning now to FIG. 4, a timing diagram for state machine 300 of FIG. 3 is shown, wherein the state machine is shown transitioning completely around the exterior of state machine 300. Arbiter circuit 22 receives clock signals over clock bus 140 (FIG. 2). At some point during the idle state, one or more requests are received and the state machine transitions from the idle state to state S1. The controller asserts the shift line 122 and sets the load line to low. At this time, the latched requests and the history register contents are sent to memory 104, and grants are put out on grant line 128, causing grants line to go high. At the same time, it asserts the grant latch line 130 to latch the grant output to lines 32, 34, 36, and 38 (FIGS. 1 and 2). After one clock cycle in state S1, a transition is made to state S2, where, in response to the grant, the ARBREQ lead 120 goes low and the controller asserts the shift lead 132 for one cycle. The controller then waits in state S2 330 until the "done" signal is asserted, indicating that the selected device has completed operations, at which time it transitions to state S3 340 where the load signal 122 is asserted. At some time during state S3 the "done" signal goes low. In response to this, the controller sets the grant latch signal to low and transitions back to the idle state.

Optionally, an additional field is associated with each grant in memory 120, as illustrated in FIG. 7, stating the number of cycles that the device receiving the grant will use before asserting done line 40. Controller 102 uses this information to count clock cycles (from clock line 140) and starts the next state slightly before the done signal is asserted. In this manner, an arbitration circuit according to an exemplary embodiment of this invention, may be made in a pipelined configuration.

The operation of the history circuit and memory will now be explained in connection with FIGS. 5–12. In this exemplary embodiment, history register 500 (FIG. 5) comprises twenty bits divided into five groups of four bits each. Each of four sets of four bits represents a previous grant. In FIG. 5, H0 is the last grant. H1 is the grant previous to H0, H2 is the grant previous to H1, and H3 is the grant before H2. As each grant is made, it is shifted into H0. H0 is then shifted into H1, etc., and H3 is shifted out of the history register. The final 4 bits are the "request" bits from the request latch. These are the index bits.

The history register of FIG. 5 is used to address a block of memory containing grant bits. The "index" bits map directly on the request bits from the devices, as found at request latch 110. Assume, for this discussion, that only one bit in each of the previous grants of the history register is set at a time, and that all nonaddressable addresses in this scheme generate an error signal. In H0–H3, only one bit in each group can be set because only one grant is given at a time in this exemplary embodiment. Optionally, these four registers (H0–H3) can also be encoded to save address space and make the RAM smaller.

In operation, the requests are entered into the system (by devices 14, 16, 18, and 20) and produce an address to the memory 104, is shown in FIG. 6 as "xxxx." This address consists of 16 possible entries. The address identifies a location in RAM that contains 4 bits of grants. These grants are set up according to a specific algorithm, such as that shown in FIG. 7. FIG. 7 illustrates a block of memory that contains a simple priority grant algorithm; however, the arbitration scheme is not required to be the "priority" scheme shown. Note also that all variations of the request leads are covered. Each variation results in one grant bit G3 through G0 being set (selected) while the others are set to 0 (unselected).

The output of the memory section is used by the arbiter to grant a request (put onto grant lines 32, 34, 36, and 38, FIG. 1) and is also loaded into the H0 address section. Assume that the request bits were [1001] which, according to the table of FIG. 7, results in grant 0 being set [0001]. The RAM address in the next cycle appears as shown in FIG. 8.

This history register address again addresses a 16 location block of the RAM (but not the same block as illustrated in FIG. 7). One of the 16 locations is selected by the request section of the address. The data in the 16 locations is an example of the round robin algorithm with the stipulation that request 0 was granted in the last cycle. This means that if any other requests are pending, they will be serviced before request 0. In this case the next grant will be chosen from the other requests on a priority basis, although this need not be the case.

Assume the request bit pattern for the next cycle is still [1001]. This results in grant 3 being given on this cycle. The RAM address appears as in FIG. 9 on the next cycle. This is a new 16 location section selected by the address in the H0–H3 section of the address. This section contains the grant for any variation of the request leads possible. The grant bits are selected in this exemplary embodiment using the round robin algorithm with the stipulation that requests 0 and 3 have been granted already. If the next cycle request leads are [1010], then the RAM will respond with a grant 1 because grant 3 has been granted and grant 1 has not. The RAM address will now appear as in FIG. 10 below for the next cycle.

These 16 locations are selected because requests 0, 1 and 3 have been previously granted. Note that request 3 was asserted and was not serviced. In the next cycle, the request address is [ 1100]. The RAM responds with a grant 2 [0100] because request 2 had not been serviced. Note again that request 3 was not serviced because of the round robin algorithm.

The new address for the RAM appears as in FIG. 11 for the next cycle. All of the requests have been serviced, and if the request address for the next cycle is [1011], the result will be a grant 0 because it was the earliest served. The new RAM address is then as in FIG. 12.

Each section of the RAM consists of a set of locations that define all of the possible states of the grant bits in accordance with the round robin algorithm. The algorithm used is up to the system designer. In addition, it is possible to create special algorithms which reflect peculiarities of the machine using the arbitrator. In short, the arbitrator can be as general or as specific as needed, using the same hardware.

It is to be understood that the above-described embodiment is merely an illustrative principle of the invention and that many variations may be devised by those skilled in the art without departing from the scope of the invention. It is, therefore, intended that such variations be included within the scope of the claims.

We claim:

1. A system for providing arbitration of allocation requests from a plurality of requesters based on the history of a plurality of prior grants of requests by such requesters, said system comprising:

input means for receiving requests from said plurality of requesters;

storage means for defining a plurality of grants, said plurality of grants comprising a grant for each possible configuration of requests and prior requests;

history means for sequentially/recording said plurality of previous grants; and control means connected to said history means, said input means and said storage means for applying said received requests from said input means and said plurality of previous grants from said history means directly to said storage means and selecting one of said plurality of grants responsive to said received requests and said plurality of previous grants, providing a grant indication representative of said selected grant to one of said requesters.

2. The system of claim 1 wherein said history means comprises a first in, first out (FIFO) queue, and wherein each grant is moved through said FIFO queue.

3. The system of claim 2 wherein said storage means comprises a plurality of blocks, each of said plurality of blocks including a subset of said plurality of grants, wherein said control means selects one of said blocks by using said FIFO queue as an address and selects one of said grants from said selected block by using said requests to select a location in said selected block.

4. A system for providing arbitration of allocation requests from a plurality of requesters based on the history of a plurality of prior grants of requests by such requesters, said system comprising:

input means for receiving requests from said plurality of requesters;

storage means for defining a plurality of grants, said plurality of grants comprising a grant for each possible configuration of requests and prior requests;

history means for recording said plurality of previous grants, said history means comprising a register wherein each grant is moved sequentially through said register;

a writable mask register, wherein said mask register selectively alters portions of the contents of said history means;

control means connected to said history means, said input means and said storage means for applying said received requests from said input means and said plurality of previous grants from said history means to said storage means and selecting one of said plurality of grants responsive thereto, providing a grant indication representative of said selected grant to one of said requesters.

5. A system for providing arbitration of bus allocation requests from a plurality of requester, said system comprising:

input means for receiving requests from said plurality of requesters;

output means for communicating grants to said plurality of requesters;

a storage means containing a plurality of look-up tables, each of said look-up tables having a plurality of grants, each of said plurality of grants corresponding to each of the possible request inputs;

a history register for sequentially recording the history of a plurality of previous bus request grants; and control means connected to said output means, said input means, said history register and said storage means for using said history of from said history register to select one of said plurality of look-up tables, applying said requests directly to said look-up table to select one of said plurality of grants, and providing grant authorization signals representative of said selected grant to one of said requesters via said output means.

6. The system of claim 5 wherein one or more of said plurality of lookup tables may be dynamically updated.

7. The system of claim 5 wherein, when said grant signals are provided by said control means, said control means also performs error checking of said grant signals.

8. The system of claim 7 wherein each entry in said table includes a parity indication, and said error checking includes checking the parity of said grant signals.

9. The system of claim 7 wherein said table includes a cyclical redundancy check value, and said error checking includes performing a cyclical redundancy check on said grant signals.

10. The system of claim 5 wherein said table is contained in a random access memory (RAM).

11. The system of claim 5 wherein said table is contained in a read-only memory (ROM).

12. The system of claim 5 wherein one of said tables is contained in ROM, and the remainder of said plurality of tables is in RAM.

13. The system of claim 12 wherein said control means performs error checking on said grant signals, and, responsive to said control means determining that an error is encountered, said control means applying said determined arbitration state solely to said table in said ROM.

14. A system for providing arbitration of bus allocation requests from a plurality of requesters, said system comprising:

input means for receiving request from said plurality of requesters;

a storage means containing a plurality of look-up tables, each of said look-up tables having a plurality of grants, each of said plurality of grants corresponding to each of the possible request inputs;

a history register for recording the history of a plurality of previous bus request grants;

a mask register connected to said history register, said mask register being dynamically writable and capable of over-writing said history register to alter said determined arbitration state; and control means connected to said output means, said input means, said look-up table and said history register for selecting one of said plurality of look-up tables, applying said requests from said input means and said previous bus request grants from said history register to said look-up table to select one of said plurality of grants, and providing grant authorization signals representative of said selected grant to one of said requesters.

15. A method for providing arbitration of bus allocation requests from a plurality of requesters based on the history of a plurality of prior bus request grants, said method comprising:

receiving a plurality of requests for use of said bus;

responsive to said plurality of requests, applying a history register containing said plurality of previous grants in sequential order to said plurality of requests to determine a selected arbitration state;

using said selected arbitration state as an index into an arbitration state table, said arbitration state table comprising a plurality of arbitration states and a corresponding plurality of grants; and issuing one of said plurality of grants directly indexed by said selected arbitration state to said requesters.

16. The method according to claim 15 further including, before issuing said grant, performing error checking on said grant.

17. The method according to claim 16 wherein said error checking comprises parity checking.

18. The method according to claim 16 wherein said error checking comprises cyclical redundancy checking.

19. The method according to claim 16 wherein said arbitration state table comprises a plurality of state tables and wherein said result is indexed into one of said plurality of arbitration state tables, and wherein, responsive to determining that an error was found, using a different one of said plurality of arbitration state tables.

20. The method according to claim 15 wherein said arbitration state table comprises a plurality of arbitration state tables, said method further including determining which of said plurality of arbitration state tables to use.

21. A method for providing arbitration of bus allocation requests from a plurality of requesters based on the history of a plurality of prior bus request grants, said method comprising:

receiving a plurality of requests form use of said bus;

responsive to said plurality of requests, applying a history register containing said plurality of previous grants to said plurality of requests to determine a selected arbitration state;

using said selected arbitration state as an index into an arbitration state table, said arbitration state table comprising a plurality of arbitration states and a corresponding plurality of grants; and issuing one of said plurality of grants indexed by said selected arbitration state to said requesters, wherein said history register is dynamically variable, and wherein applying said history register to said request also includes varying said history register.

* * * * *

UNITED STATES PATENT AND TRADEMARK OFFICE
CERTIFICATE OF CORRECTION

PATENT NO. : 5,481,680
DATED : January 2, 1996
INVENTOR(S) : Mikiel L. Larson, Wayne R. Wilcox It is certified that error appears in the above-indentified patent and that said Letters Patent is hereby corrected as shown below:

Column 6, claim 2, line 63, change "first in, first out (FIFO) queue," to --register,--

Column 6, claim 2, line 64 add the word --sequentially-- after the word moved and change "(FIFO) queue." to --register.--

Signed and Sealed this

Thirtieth Day of July, 1996

Attest:

BRUCE LEHMAN

*Attesting Officer*  *Commissioner of Patents and Trademarks*